INVENTORS
FRANK REGINALD SAXBY
WILLIAM LOUIS ROGERS
BY Louis A. Kline
THEIR ATTORNEY INVENTORS
FRANK REGINALD SAXBY
WILLIAM LOUIS ROGERS
BY Louis A Kline
THEIR ATTORNEY

INVENTORS
FRANK REGINALD SAXBY
WILLIAM LOUIS ROGERS

BY Louis A Kline
THEIR ATTORNEY

INVENTORS
FRANK REGINALD SAXBY
WILLIAM LOUIS ROGERS
BY Louis A. Kline
THEIR ATTORNEY INVENTORS
FRANK REGINALD SAXBY
WILLIAM LOUIS ROGERS
BY Louis A. Kline
THEIR ATTORNEY Feb. 9, 1960 F. R. SAXBY ET AL 2,924,382

DATA CONVERSION APPARATUS FOR TRANSFERRING DATA IN EITHER DIRECTION BETWEEN A CALCULATING MACHINE AND A COMPUTER

Filed June 19, 1957 6 Sheets-Sheet 6

INVENTORS
FRANK REGINALD SAXBY
WILLIAM LOUIS ROGERS

BY Louis A Kline

THEIR ATTORNEY

United States Patent Office 2,924,382
Patented Feb. 9, 1960

2,924,382

DATA CONVERSION APPARATUS FOR TRANSFERRING DATA IN EITHER DIRECTION BETWEEN A CALCULATING MACHINE AND A COMPUTER

Frank Reginald Saxby, Eastcote, and William Louis Rogers, Ealing, London, England, assignors to The National Cash Register Company, Dayton, Ohio, a corporation of Maryland Application June 19, 1957, Serial No. 666,521

7 Claims. (Cl. 235—155)

The present invention relates to data-conversion devices, which are adapted to convert information represented according to one system of numerals into the same information represented according to a different system of numerals, and has particular application to apparatus involving the conversion of data represented in rack-operated calculating apparatus according to one numeral system, e.g. decimal, into data according to a second numeral system, e.g. binary, and suitable for use in a computer, e.g. an electronic computer, and vice versa.

The object of the present invention is to provide data conversion apparatus capable of converting information stored in one form, e.g. decimal, by the rack settings of a mechanical calculating machine, into information represented according to a different form, e.g. binary, for use in a second computer, at high speeds consistent with the cycling time of the mechanical computer.

According to the invention, there is provided data-conversion apparatus for transferring data in either direction between a mechanical calculating machine and a computer comprising a device carried by a movable rack of a mechanical rack-operated calculating machine which rack is settable to indicate a number represented in accordance with one numeral system, a set of individually actuatable members associated with said device and means interconnecting the rack-operated calculating machine and a storage location of the computer operating with numbers represented according to a binary-coded decimal system, for actuating a predetermined number of said members and locating said device in operative relationship with the actuated member(s), whereby the particular member(s) actuated determine(s) the rack setting of the rack-operated calculating machine when converting information from the numeral system used in the computer to that numeral system according to which the rack-operated machine operates and whereby the setting of the racks of the rack-operated machine determines the particular members actuated when converting information from the numeral system used in the rack-operated machine to that numeral system according to which the computer operates.

In a preferred embodiment of the invention there is provided a pawl member connected to a rack of a rack-operated mechanical calculating machine and having an operating nose of sufficient width to cooperate with a plurality of pivoted plate members having serrations adapted to be engaged by the nose of the pawl member, the serrations being arranged such that a serration in one plate, or combinations of serrations in two or more plates, are representative of binary information stored in a storage location of an electronic computer, energising means being provided for actuating the plate members in order to group such serrations in accordance with the information stored so as to allow the pawl to cooperate with such serrations thereby to define the rack setting or determine the number to be stored corresponding to a particular rack setting.

The invention will now be described with reference to the accompanying drawings, wherein.

Figure 1:
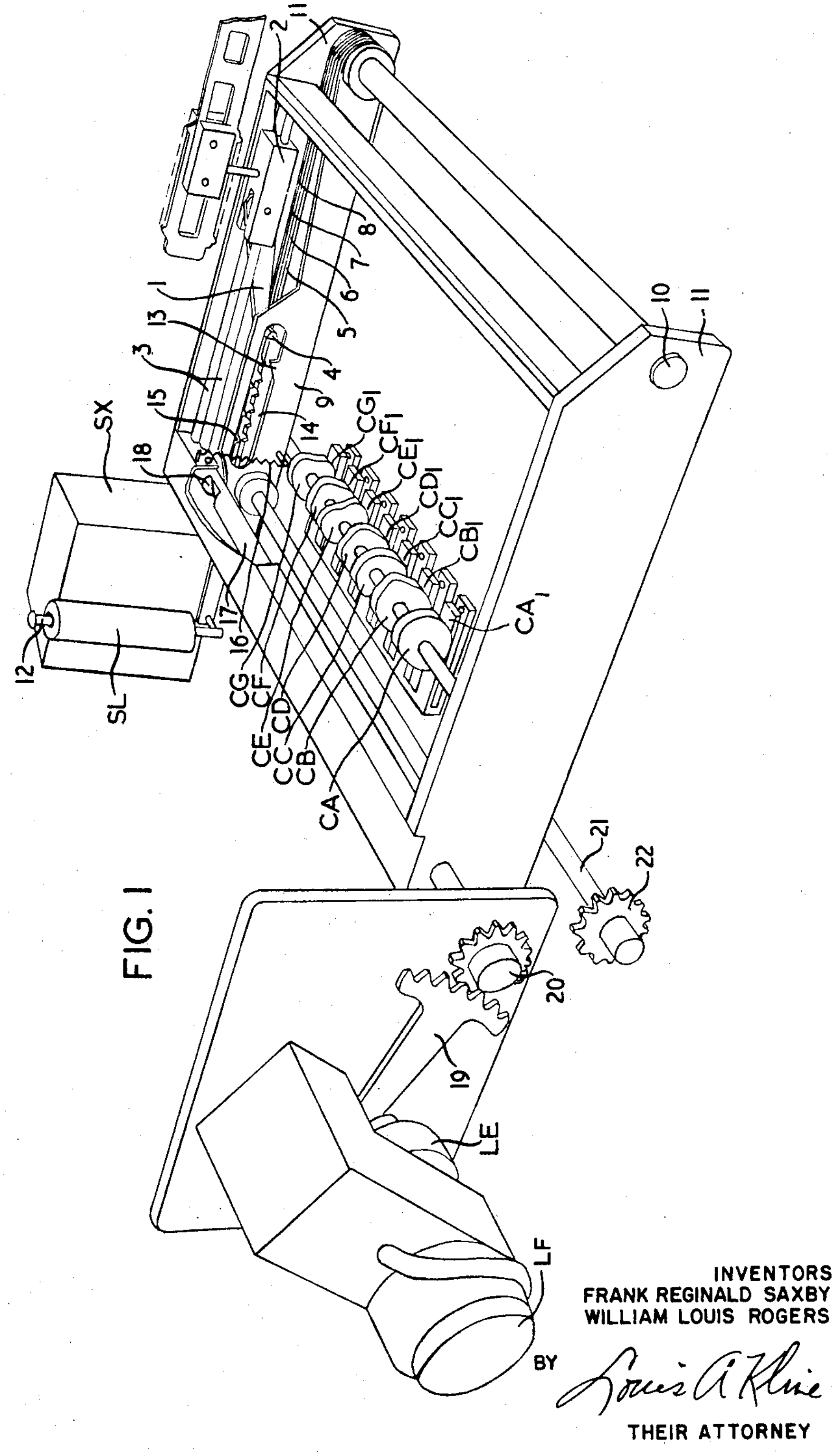
Fig. 1 is a perspective view of the data conversion apparatus showing the inter-relation between the pawl member and the plate and rack mechanisms and the actuating mechanism for operating the pawl and plates.

While the invention will hereinafter be described with particular reference to data conversion apparatus for converting information from binary form into its decimal equivalent, or vice-versa, it is to be understood that the apparatus is basically identical for other forms of conversion. For instance, the apparatus of the present invention is applicable to a sterling mechanical calculating machine, the spacing between serrations on the plates for duo-decimal denominations e.g. sterling being slightly less than for decimal denominations.

The data conversion device of the present invention comprises a plurality of plate assemblies, one for each rack of the mechanical calculator. For the sake of convenience, the invention and sequence of operations will be described with reference to one plate assembly only. Thus, as shown in the accompanying drawing, each rack of the mechanical calculator has associated therewith a pawl member 1 pivotally mounted in a block 2 located immediately below the rack and clamped thereto. The block 2 is slidably mounted on rods 3 so as to move with the rack when the mechanical calculating machine is actuated as a result of the manual or automatic depression of the motor bar on the mechanical calculating machine. The pawl 1 carried by the block 2 has a wide nose portion 4 of sufficient width to span the width of the plate assembly and is spring biassed into contact therewith. Each assembly comprises four lever plates 5, 6, 7 and 8, and a single zero stop plate 9, each mounted at one end in a pivot rod 10 located between side walls 11 of a frame member. The other ends of the lever and zero stop plates are free to be raised or lowered for a purpose hereinafter defined. Each lever plate 5, 6, 7 and 8 has associated therewith a solenoid SL; a solenoid assembly of four solenoids $SL_1$ to $SL_4$ being shown in diagrammatic box form $S_x$ in Fig. 1, and individually in Fig. 2; said solenoids being adapted to be energised either singly, or simultaneously in a particular combination so as to cause a corresponding number of lever plates to be lifted and thereby determine the setting of the pawl in a manner hereinafter described. Located within each solenoid is a plunger 12 connected to the end of each lever plate and adapted to actuate one of the contact members $L_1$ to $L_4$ for lever plates 5, 6, 7 and 8 connected in circuit with a store location of an electronic computer.

Figure 8:
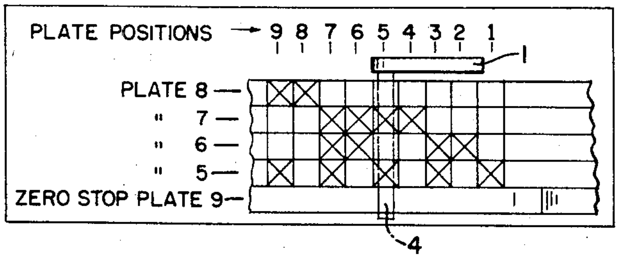
Fig. 8 is a diagram illustrating the manner in which the plate mechanism and the pawl member cooperate with each other during operation of the data conversion apparatus.

The top edges of the lever plates contacted by the nose of the pawl 1 have serrations therein, each plate having such serrations located at different positions thereof. Taking the lever plate 5 as a reference datum, and dividing that portion beyond the nose of the pawl into 9 positions, the lever plate 5 is provided with serrations at the first, third, fifth, seventh and ninth positions, the lever plate 6 is serrated at the second, third, sixth and seventh positions, the lever plate 7 is serrated at the fourth, fifth, sixth and seventh positions, and the fourth lever plate 8 is serrated at the eighth and ninth positions only. The positions for the lever plates 5, 6, 7, and 8 are shown in Fig. 8, along with the serrations which are shown represented by the squares containing intersecting lines.

Figure 7:
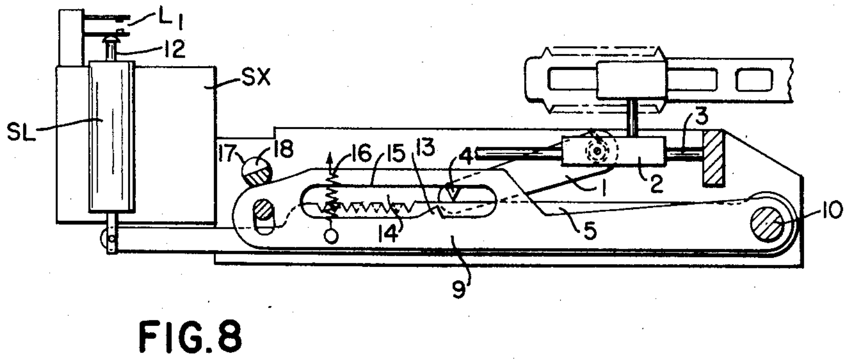
Fig. 7 is a sectional view of a portion of the data conversion apparatus shown in Fig. 1, illustrating in more detail the actuating mechanism for operating the pawl and the plates.

The zero stop plate is normally held in the lowered position shown in Figs. 1 and 7, but in order that a number stored in binary form in an electronic computer may be converted to its equivalent decimal form for use in the mechanical calculator the zero stop plate is provided with a toothed projection 13 against which the nose 4 of the pawl may abut when the zero stop plate is in its raised position, thereby preventing forward movement of the pawl 1 and its associated rack when the motor bar is depressed.

Thus, in order to convert a binary number, e.g. 0001 (corresponding to the decimal value 1) from its binary form to its decimal form, the following sequence of operations is necessary:

The solenoid associated with the lever plate 5 must be energised according to the binary number 0001 in the store location of the electronic computer. The energisation of this solenoid will raise the lever plate 5 and lift the pawl 1 over the projection 13 and, if the motor bar of the mechanical calculator is actuated, the calculator will be operated and the rack will move forward carrying with it the pawl whose nose 4 will, under the bias of its spring, drop into the first serration in lever plate 5. The rack will thus be arrested and located in its decimal setting corresponding to the binary number 0001 located in the store of the electronic computer.

Similarly, if it is required to convert the binary number 0101 to its equivalent decimal value for use in the mechanical calculator, the solenoids $SL_1$ and $SL_3$ associated with lever plates 5 and 7 will be energised to raise the lever plates 5 and 7 and lift the pawl 1 over the projection 13 on the zero stop plate 9. When the motor bar is operated and the pawl moves forward, it will drop into the first aligned serrations on the raised lever plates 5 and 7 (shown in Fig. 8), i.e. in the 5 position corresponding to a decimal value of 5. The absence of a serration in the first position of lever plate 7 will cause the pawl to ride over the first serration on lever plate 5 and the absence of serrations in the second position of lever plate 5, third position of lever plate 7, and fourth position of lever plate 5, will cause the pawl to ride over these positions until it reaches the aligned serrations at position 5, as explained.

The following table indicates the lever plates required to be raised in order to convert a binary number to its decimal equivalent:

| Decimal Number | 1 | 2 | 3 | 4 | 5 | 6 | 7 | 8 | 9 |
|---|---|---|---|---|---|---|---|---|---|
| Plate 5, Binary 0001 | X | ------ | X | ------ | X | ------ | X | ------ | X |
| Plate 6, Binary 0010 | ------ | X | X | ------ | ------ | X | X | ------ | ------ |
| Plate 7, Binary 0100 | ------ | ------ | ------ | X | X | X | X | ------ | ------ |
| Plate 8, Binary 1000 | ------ | ------ | ------ | ------ | ------ | ------ | ------ | X | X |
| Binary Equiv | 0001 | 0010 | 0011 | 0100 | 0101 | 0110 | 0111 | 1000 | 1001 |

In order to enable a decimal number setting on the keyboard of the mechanical calculator to be converted to its equivalent binary form for input to the store of an electronic computer, the zero stop plate 9 is provided with a cut-away portion 14 defining a surface 15. When the zero stop plate 9 is in its lowered position, shown in Figs. 1 and 7, the pawl is no longer located behind the projection 13 but is situated between the top edges of the lever plates 5, 6, 7 and 8 and the surface 15 such that the pawl may move in a forward direction but not lift. This is the normal standing position of the data conversion device.

The zero stop plate is biassed to its raised position by means of a spring 16 but held in its lowered position by means of a cam rod 17 provided with a plurality of slotted portions 18 spaced at intervals throughout its length. The rounded part of the cam rod 17 bears on the top surface of the zero stop plate 9 to hold the plate in its lowered position.

A rotary transmission device, such as a solenoid LE, known under the registered trademark "Ledex," is adapted, when energised, to transmit a rotary motion to a toothed segment 19 which engages a sprocket wheel 20 mounted on the cam rod 17 so as to turn the rod through 180° thereby locating the slotted portions 18 of the cam rod 17 above the zero stop plate 9 and allowing the plate to rise under the action of the spring 16. A further Ledex solenoid LF is provided for returning the cam rod 17 to its original position.

The Ledex solenoids are energised in timed relation with each other and the remainder of the mechanism by providing an auxiliary cam shaft 21 having a sprocket 22 fixed thereto and adapted to be driven by means such as a chain from the main motor shaft of the mechanical calculator. The cam shaft 21 is provided with seven cam members CA, CB, CC, CD, CE, CF and CG. The two cams, CD and CE are provided with contact members $CD_1$, $CE_1$ respectively, which, during the rotation of the auxiliary cam shaft 21, are adapted to close circuits to the Ledex solenoids LE and LF, respectively, so as to cause timed energisation thereof.

The cam CF, located on the auxiliary cam shaft 21, is associated with contact members $CF_1$ which, when closed, cause simultaneous energisation of the solenoids $SL_1$ to $SL_4$ for actuation of the lever plates 5, 6, 7 and 8.

The sequence of operations for converting a decimal number represented on the keyboard of the mechanical calculator into its binary equivalent for input into the store of the electronic computer will now be described with particular reference to Fig. 2.

The mechanical calculator may be of the type described in Letters Patent of the United States No. 2,626,749, granted January 27, 1953, to Raymond A. Christian et al., and the sequence of operations involving the data conversion device will be described with particular reference thereto.

When the mechanical calculator tabulates to a stop calling for a reading operation, i.e. an operation in which a particular number represented by the rack settings of the mechanical calculator is transferred to a storage location of the electronic computer, the "reading" contacts X associated with the stops on the form bar of the mechanical calculator are closed thereby. The contacts X are connected via cam contacts $CA_1$, to a source of positive potential and the cam contacts $CA_1$, are adapted to be closed by cam CA during a rotation of between 5° and 15° of the main motor shaft (line E of Fig. 5). Closing of contacts $CA_1$ and X connect the positive potential to relay RR to cause energisation thereof and operating its associated contacts $R_1$, $R_2$, $R_3$ and $R_4$.

The cam member CB located on the auxiliary cam shaft 21 is arranged via associated cam contacts $CB_1$ to lock the relay RR connected via the cam contacts $CB_1$ and contacts $R_1$ to a positive potential source of 50 v., the closing of contacts $R_2$ causing a signal to be sent on line 23 to the electronic computer to condition it for a "reading" operation by preparing the computer to receive data signals.

If it is assumed that a keyboard entry of "5" is made in the mechanical calculator, when the motor bar thereof is depressed manually, the pawl 1 carried by one of the racks will ride along the top surfaces of the lever plates 5, 6, 7 and 8 and come to rest at the fifth position, being biassed downwards by its leaf spring, but not located in the serrations at the fifth position due to the absence of serrations at such position on lever plates 6 and 8 (see table). The rack carrying the pawl 1 commences to advance when the main motor shaft, in response to the depression of the motor bar, has turned through 35° and any racks actuated are in position when the shaft has turned through 150°, as shown in line B of the timing diagram shown in Fig. 5. After the main shaft has turned through an angle of 155°, as shown in line G of Fig. 5, the cam member CF, located on the auxiliary shaft 21, and connected via contacts $R_2$ of relay RR to the positive potential source of 50 v., is arranged to close associated cam contacts $CF_1$ to energise relay RB, thereby closing normally open contacts $B_1$ to $B_5$ associated therewith and thereby energising relays MA, MB, MC, MD located one in each of the cathode circuits of a tube located in a store location of the electronic computer and closing contacts A, B, C and D associated with said relays, and connected in parallel to the contact $B_1$.

The closing of relay contacts A, B, C and D connects the solenoids $SL_1$ to $SL_4$ associated one with each of the lever plates 5, 6, 7 and 8, to the positive potential source of 50 v. via the previously closed contacts $B_1$ of relay RB and contacts $R_3$ of relay RR, thereby energising all the solenoids simultaneously.

Figure 2:
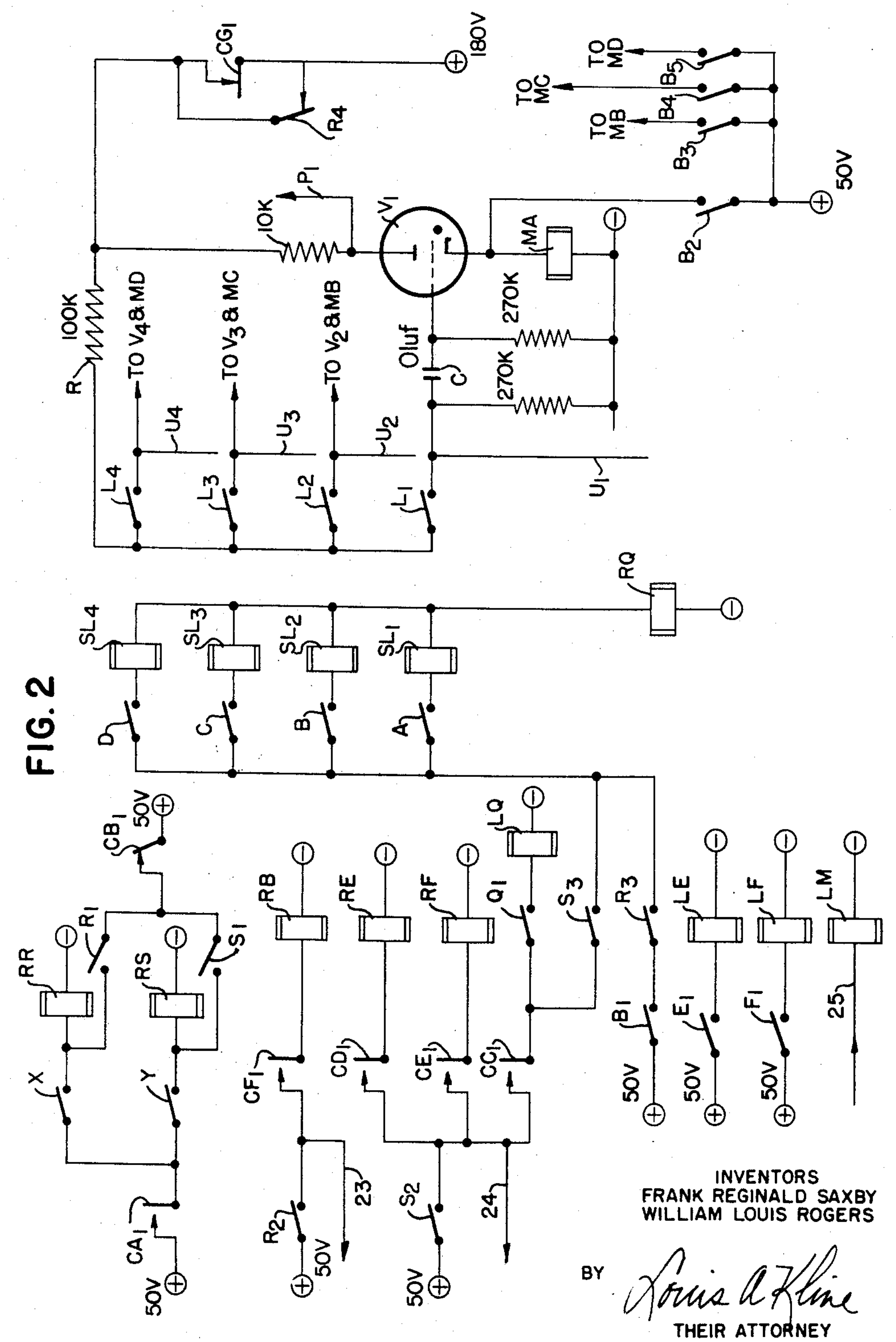
Fig. 2 is a circuit diagram showing the interconnections between the operating members of the mechanical calculating machine and a store location of the electronic computer.

Each store location comprises four gas discharge tubes $V_1$ to $V_4$, one of which is shown in full at $V_1$ in Fig. 2, and each of which are preferably gas triodes. The tube $V_1$ is provided with a trigger electrode connected via a capacitor C, normally open switch contact $L_1$ associated with solenoid $SL_1$, a 100 kilohm resistor R and cam contacts $CG_1$ adapted to be closed by the cam CG, to a source of positive potential of 180 v. During an angular rotation of between 10° and 100° of the main shaft, as shown in line F of Fig. 5, the cam CG is actuated to open contacts $CG_1$ in the HT lead connecting the anodes of the tubes $V_1$ to $V_4$ to the source of positive potential of 180 v., thereby extinguishing any tubes in the store location which remained conducting after a previous storage operation, the normally closed contact $R_4$ associated with relay RR having been opened when relay RR was energised.

As explained earlier, the energisation of relay RB after a 155° revolution of the main shaft (line G of Fig. 5) causes the solenoids $SL_1$ to $SL_4$ to be simultaneously energised and they endeavour to lift the lever plates 5, 6, 7 and 8 associated therewith. However, only those plates having serrations aligned beneath the nose of the pawl 1 are able to lift, viz. lever plates 5 and 7. The lifting of these plates causes the plungers 12, located within the solenoids $SL_1$ and $SL_3$ associated with these plates, to lift, thereby closing normally open contacts $L_1$ and $L_3$ associated therewith. The contacts $L_1$ to $L_4$ are located one in each of the trigger inputs to the tubes $V_1$ to $V_4$, respectively, and the lifting of plates 5 and 7 will cause contacts $L_1$ and $L_3$ to couple the 180 v. positive potential source to the trigger electrodes of tubes $V_1$ and $V_3$ via capacitor C and via cam contacts $CG_1$ associated with cam member CG, which has now been rotated to a position as shown in line F of Fig. 5, where it effects closure of contacts $CG_1$ in the HT lead. The application of the positive potential to the input electrode of tubes $V_1$ and $V_3$, causes these tubes to conduct, producing in each an output pulse at the anode thereof. The output pulses are transmitted to the store location of the electronic computer via output leads. The output lead for the tube $V_1$ is shown at $P_1$.

Figure 5:
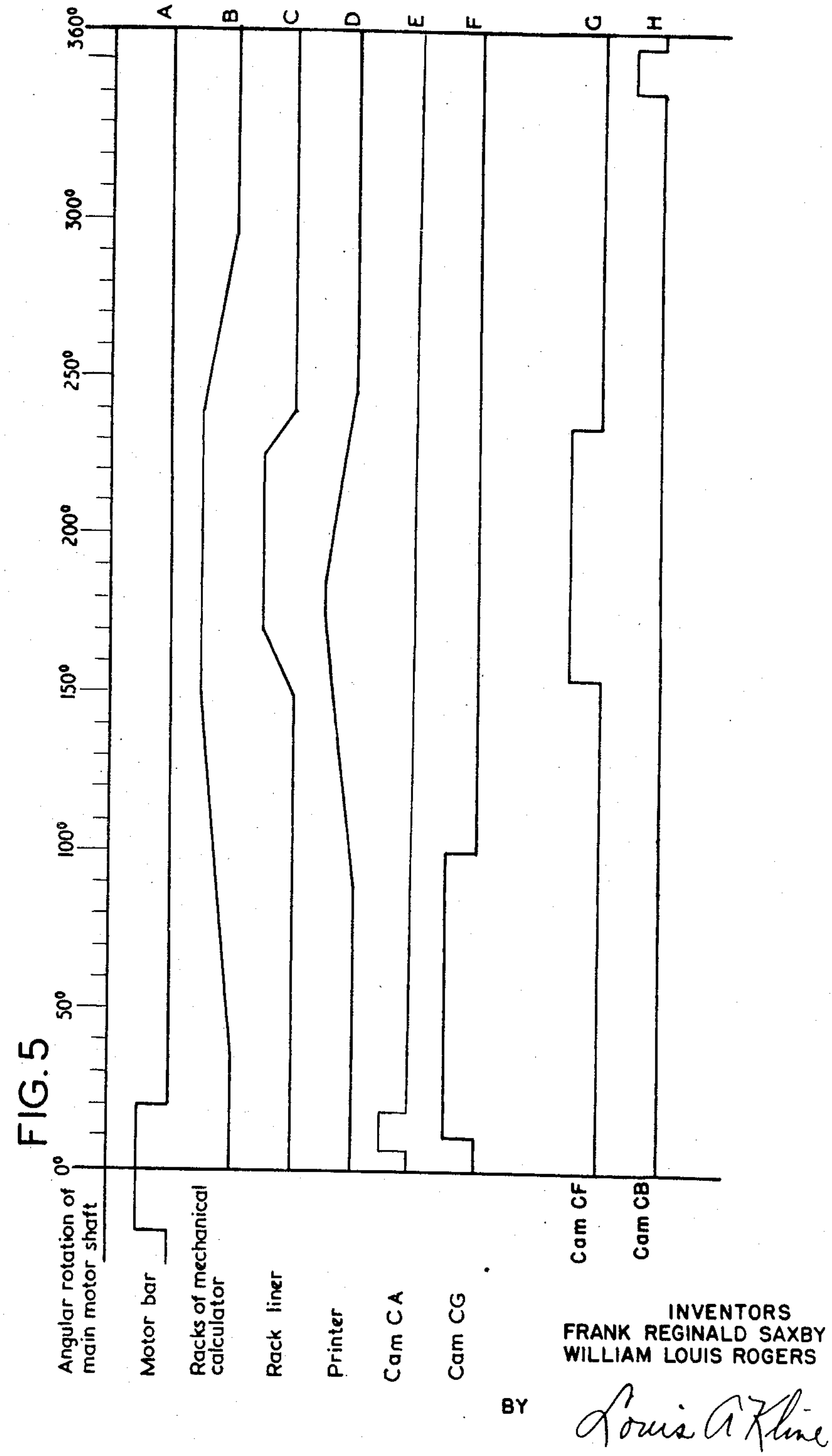
Figs. 5 and 6 are timing diagrams for the reading and setting operations respectively.

When the main shaft has rotated through an angle of 235°, the position as shown in line G of Fig. 5, reached by cam member CF causes cam contacts $CF_1$ to open, and relay RB to be de-energised, and contact $B_1$ to open, thereby de-energising solenoids $SL_1$ to $SL_4$. The racks of the mechanical calculator commence to restore after the main shaft has turned through 240° and are in the inoperative position, with the pawls in the position shown in Fig. 1, after the main shaft has moved through 295° as shown in line B of Fig. 5. When the main motor shaft has moved through an angle of between 340° and 355°, as shown in line H of Fig. 5, the cam CB is in a position to open contacts $CB_1$ and unlock relay RR, which is de-energised.

Thus, it is seen that the binary equivalents of the serrations on the plates 5 and 7, viz. 0001 and 0100, cause the operation of the contact members within the appropriate solenoids such that the binary number 0101, corresponding to decimal number "5," is transmitted to the store of the electronic computer as a parallel input, and that, when converting data from the mechanical calculator to the electronic computer, the setting of the rack mechanism of the mechanical calculator determines the actuation of the plate members of the transducer.

The sequence of operations for converting a binary number stored in a store location of the electronic computer into its decimal equivalent for use in the mechanical calculator will now be described with particular reference to Fig. 2.

When the mechanical calculator tabulates to a stop calling for a "set" operation, i.e. an operation in which the racks of the mechanical calculator are set according to the output from the electronic computer, the "set" contacts Y associated with the stops on the form bar of the mechanical calculator, are closed thereby.

While the motor shaft is moving through an angle of from 5° to 15° (line J of Fig. 6), cam CA closes associated cam contacts $CA_1$ thereby connecting a positive potential to relay RS to cause energisation thereof to close its associated contacts $S_1$, $S_2$, $S_3$.

The cam member CB closes associated cam contacts $CB_1$ to lock the relay RS connected via the cam contacts $CB_1$ to the source of positive potential, and the closing of relay contacts $S_2$ causes a signal to be sent on line 24 to the electronic computer to condition it for a "setting" operation. The closing of contacts $S_2$ of relay RS connects the positive potential of 50 v. in parallel to one side of each of three cam contacts $CC_1$, $CD_1$ and $CE_1$, associated with cam members CC, CD and CE respectively located on the auxiliary cam shaft 21.

If it is assumed that a binary value 0101, corresponding to a decimal value "5," is located in a store location of the electronic computer and is to be transferred to the mechanical calculator, it will be seen from the table that such an operation will necessitate raising lever plates 5 and 7 corresponding to binary values 0001 and 0100, respectively. Thus, when the motor bar of the mechanical calculator is actuated, the nose of the pawl 1 will be carried forward by the forward advance of the rack and come to rest in the first aligned serrations in the raised plates, viz. at the fifth position of the plates 5 and 7.

Referring again to Fig. 2, when the electronic computer has been conditioned by the signal transmitted on line 24, an impulse is applied to line 25 from the electronic computer, to energise and rotate a Ledex solenoid LM which pulls down the motor bar of the mechanical calculator.

Figures 3, 4:
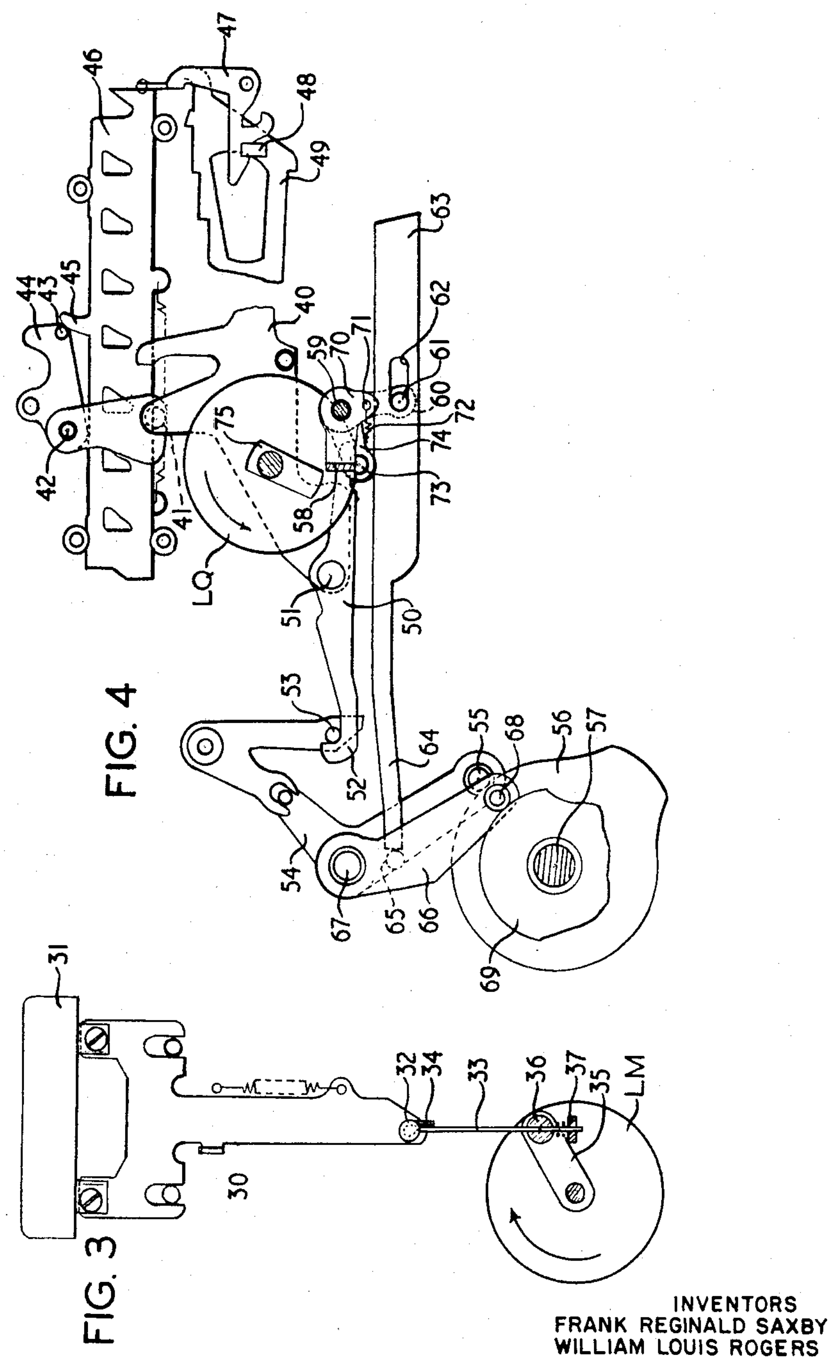
Fig. 3 is an elevation showing the mechanism for actuating the main motor bar of the mechanical calculator.
Fig. 4 is a sectional elevation showing the mechanism for releasing the zero stop pawls of the mechanical calculator.

The mechanism for actuating the motor bar is shown in Fig. 3 and is as follows:

The stem 30 of the motor bar 31 of the mechanical calculator is provided with a stud 32 projecting from the bottom of the stem. A wire link 33 is located on the stud 32 by means of an eye portion 34 and extends from the stud to the Ledex solenoid LM. An arm 35 is secured to the shaft of the solenoid and provided with a stud 36 having a cylindrical bore adapted to receive the wire link. The end of the link is threaded and provided with a locking nut 37 and a compression spring held compressed between the nut 37 and stud 36. When the movable plate of the Ledex solenoid LM rotates in the direction of the arrow shown in Fig. 3, the arm is rotated to pull down the wire link and with it the stem of the motor bar 31.

In the normal standing position of the data conversion device the zero stop plates 9 are held depressed by the rounded portions of the cam rod 17 and, thus, the pawl 1 is located between the top surfaces of the lever plates and the surface 15 of the zero stop plate 9. Thus, the pawl 1 can move forward when the rack carrying it advances, but cannot lift. The lever plates are also unable to lift and, in order to enable the lever plates 5 and 7 to be raised when their respective solenoids are operated, Ledex solenoid LE is provided such that, when the main motor shaft has rotated through an angle of 10° as shown at line C in Fig. 6, the cam CD closes its associated contacts $CD_1$ causing energisation of relay RE which closes its normally open contacts $E_1$ so as to connect the Ledex solenoid LE to the positive potential source of 50 v. The solenoid LE rotates and causes the cam rod 17 to rotate such that the slotted portions 18 thereof move opposite the ends of the zero stop plates 9, allowing the zero stop plates to rise and thereby locating the nose of pawl 1 behind the projection 13 on the zero stop plates.

In the electronic computer, the tubes $V_1$ to $V_4$ of a store location are rendered conducting by input pulses applied selectively to input lines $U_1$ to $U_4$. The signal sent on line 24 causes the computer to operate to apply impulses selectively to lines $U_1$ to $U_4$ according to the binary number to be output to the mechanical calculator. In the case of binary number 0101, tubes $V_1$ and $V_3$ will be rendered conducting by input pulses applied to inputs $U_1$ and $U_3$, respectively, thereby energising relays MA and MC located in the cathode circuits of tubes $V_1$ and $V_3$, respectively and effecting closure of contacts A and C associated with solenoids $SL_1$ and $SL_3$ respectively.

Figure 6:
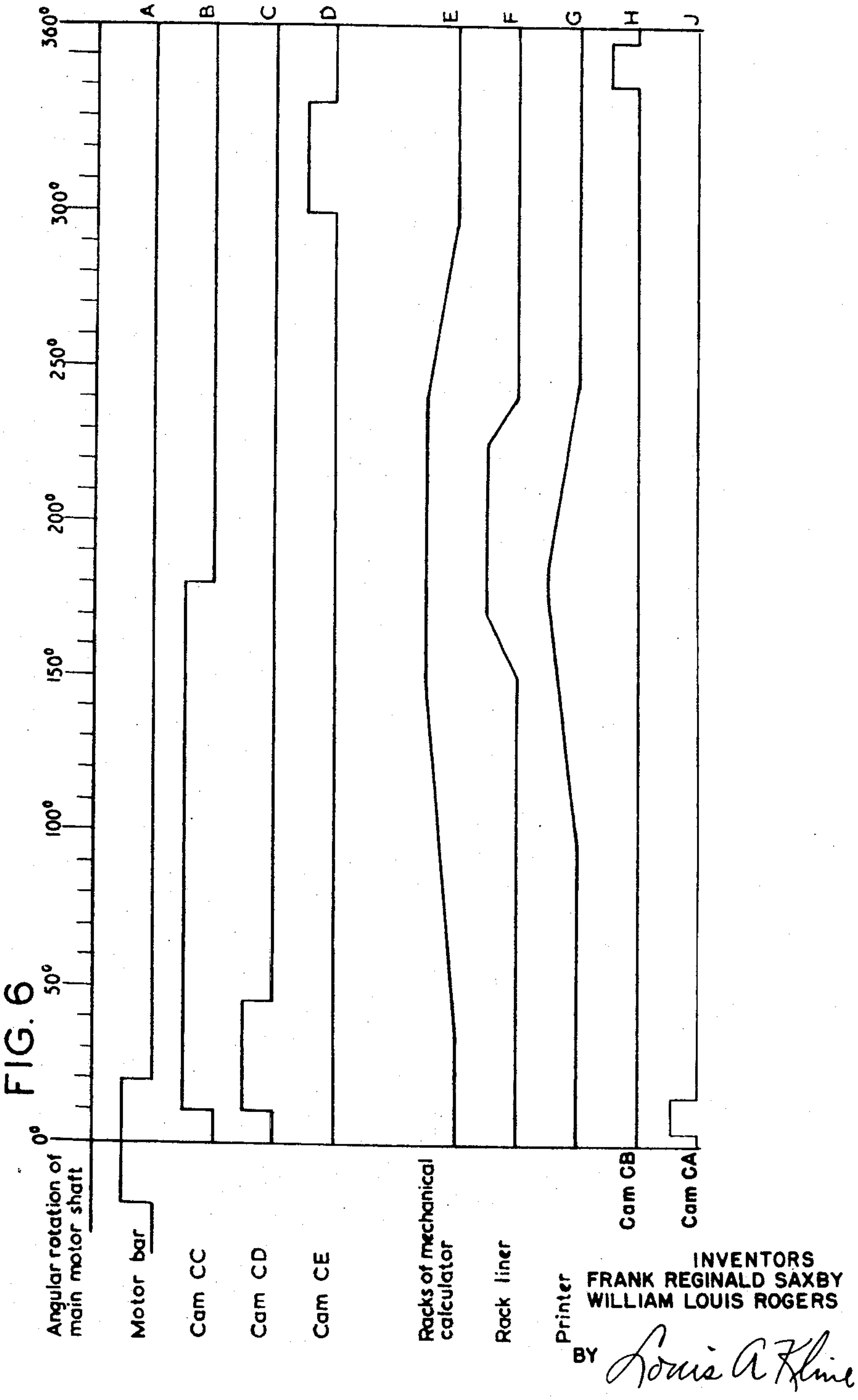

After the main shaft has turned through an angle of 10° as shown at line B in Fig. 6, cam CC closes associated cam contacts $CC_1$ to connect the 50 v. positive potential, via contacts $S_2$ and $S_3$ of relay RS, to contacts A and C of the relays MA and MC, respectively, thereby allowing the solenoids $SL_1$ and $SL_3$ to become energised and lift their associated lever plates 5 and 7, thereby lifting the pawl over the projection 13 on the zero stop plate 9.

In rack-operated mechanical calculators, zero stop pawls are provided for preventing forward movement of the racks.

In the aforementioned Christian patent, means have been provided for releasing the zero stop pawls to enable the differential actuators to move to the rear of the machine. Such means are shown in Fig. 4 and include a key release slide 40 adapted to be moved to the rear of the machine thereby causing a stud 41 on the slide, to rock shaft 42 clockwise to cause a stud 43 on the arm 44 to ride on the cam face 45 provided on a control slide 46 thereby moving the slide forward and causing the zero stop pawl 47 secured to the slide 46 to pivot and disengage from the stop 48 provided on a differential actuator 49, thereby allowing the latter to move to the rear under the action of springs (not shown). The actuation of the key release slide 40 is effected by the following mechanism:

A key release latch 50 is pivotally mounted on a stud 51 mounted on the end of the key release slide 40. The latch 50 is provided with a hook 52 which coacts with a stud 53 provided on a linkage generally designated 54. The end member of the linkage is provided with a roll 55 adapted to cooperate with the periphery of a cam member 56 mounted on a shaft 57. On rotation of the shaft, the lobe of the cam 56 is arranged to rock the linkage 54 to move the stud 53 rearwardly to effect movement of the key release slide 40 as described.

However, in order to prevent early release of the key release slide 40, a bail 58 is mounted on a shaft 59. An arm 60 is pinned to the shaft 59 and provided with a stud 61 movable within a slot 62 in a slide member 63. The slide 63 is provided with a rearwardly extending tail 64 which abuts against a stud 65 secured to an arm 66 pivoted on shaft 67 and provided with a roll 68 adapted to ride on the periphery of cam member 69 mounted on shaft 57. The bail 58 has an arm 70 integral therewith and having a stud 71 to which is fastened one end of a spring 72, the other end of which is secured to the frame of the machine. The spring 72 urges the slide 63 to the rear and forces the tail 64 into contact with the stud 65. Consequently, when shaft 57 is rotated in the direction of the arrow, the slide 63 will be permitted to move to the rear thus allowing the shaft 59 to be rotated under the urgency of the spring 72 thereby causing a stud 73 fixed to an arm 74 mounted on the shaft 59, to rotate the key release latch 50 counterclockwise so disengaging the hook 52 from the stud 53 and preventing actuation of the key release slide 40.

In order to ensure release of the zero stop pawls at the beginning of the machine cycle for the purposes of the present invention, a Ledex solenoid LQ (Figs. 2 and 4) is provided with a lug 75 secured to the movable plate thereof such that energisation of the solenoid LQ causes the plate to rotate in the direction of the arrow shown in Fig. 4, to move the lug 75 into the path of the bail 58 thereby preventing rotation of the shaft 59 when the shaft 57 is rotated, as described above, with consequent lifting of the key release latch 50. Thus when the machine cycles to rotate the shaft 57, the key release slide 40 will effect release of the zero stop pawls in the manner hereinbefore described.

Thus when the solenoids $SL_1$ to $SL_4$ are selectively energised, a low resistance relay RQ is arranged to be energised to close contacts $Q_1$ and energise the Ledex solenoid LQ which operates to enable the zero stop pawls 47, to be disengaged from the racks, thus leaving the racks and pawls 1 carried thereby, free to advance.

When the main motor shaft has turned through an angle of 35°, the racks, as shown at line E in Fig. 6 commence to advance, and when the shaft has turned through 150° the racks are in position, i.e. the nose of the pawl is located in the aligned serrations of raised lever plates 5 and 7.

Printing segments, controlled by the positions of the racks on the mechanical calculator, are thus located in the required positions for effecting a printing operation, and printing occurs when the main motor shaft has turned through an angle between 175° and 185° as shown at line G in Fig. 6.

When the motor shaft has turned through an angle of 180°, the cam member CC as shown at line B in Fig. 6, is rotated to a position such that the contacts $CC_1$ associated therewith open and cause solenoids $SL_1$ and $SL_3$, and low resistance relay RQ, to be de-energised, thereby opening contacts $Q_1$, and thereby de-energising Ledex solenoid LQ which enables the zero stop pawls of the mechanical calculator to be re-inserted by means of the mechanism shown in Fig. 4. The racks begin to restore after the motor shaft has moved through an angle of 240° and are in the rest position and held by the zero stops when the motor shaft has turned through 295°, as shown at line E in Fig. 6.

Between 300° and 335° of angular rotation of the main shaft of the mechanical calculator, as shown at line D in Fig. 6, cam member CE is rotated to a position such that contacts $CE_1$ associated therewith are closed to energise relay RF, thereby completing a circuit via contacts $F_1$ to energise the Ledex solenoid LF which is used to return the cam rod through 180°, thereby bringing the rounded portions thereof opposite the ends of the zero stop plates 9 and depressing the latter thereby locating the pawls 1 between the top surfaces of the lever plates and the surface 15 of the zero stop plates, i.e. the normal standing position of the data conversion device.

Between 340° and 355° of angular rotation of the main shaft, as shown at line H in Fig. 6, cam member CB is rotated to a position to open contacts $CB_1$ such that relay RS is de-energised and its associated contacts opened.

Thus, it is seen that when converting information stored in binary form in an electronic computer into its equivalent decimal form suitable for use in a mechanical calculator, the actuation of the lever plates determines the rack setting of the mechanical computer.

We claim:

1. In a computing system having a calculating machine having a differentially movable member which is settable to represent numbers in accordance with the decimal system, and a computer having a storage means which is settable to represent numbers according to a combinational code system, data conversion apparatus for transferring data in either direction between said calculating machine and said computer comprising: a control member carried by the differentially movable member of said calculating machine; a plurality of actuable members associated with said control member, each of said actuable members having a portion thereof divided into a plurality of index positions and having serrations provided at some of the index positions thereof; means for actuating said actuable members; means for normally preventing actuation of said actuable members except actuable members having serrations at an index position adjacent to which said control member may be located; means for advancing the differentially movable member of said calculating machine; means including said advancing means for causing said differentially movable member to be set according to a decimal number entered into said calculating machine whereby the setting of said differentially movable member causes said control member to be located at an index position corresponding to that decimal number; means for rendering said actuating means effective to actuate those actuable members having serrations at the index position adjacent to which said control member is located when the number represented by the setting of said differentially movable member is to be transferred to said storage means of said computer; means responsive to the actuable members thus actuated for setting up a number in said storage means of said computer corresponding to that number represented by the setting of said differentially movable member; means for making said actuation-preventing means ineffective when said differentially movable member is to be set according to a number set up in said storage means of said computer; and means for rendering said actuating means effective to actuate certain of said actuable members in accordance with the number set up in said storage means of said computer; said advancing means being then operable to cause said control member to cooperate with the serrations provided at a predetermined index position of said actuable members thus actuated to set said differentially movable member to represent a decimal number corresponding to that number set up in said storage means of said computer.

2. In a computing system having a calculating machine having a differentially movable member which is settable to represent numbers in accordance with the decimal system, and a computer having a storage means which is settable to represent numbers according to a combinational code system, data conversion apparatus for transferring data in either direction between said calculating machine and said computer comprising: a control member carried by the differentially movable member of said calculating machine; a plurality of actuable members, in the form of lever plates, associated with said control member, each of said lever plates having one end pivotally supported and having the other end located in a first position, said other end adapted to be actuated to a second position, each of said lever plates having a portion thereof divided into a plurality of index positions and having serrations provided at some of the index positions thereof; means for actuating said serrated lever plates; a further lever plate associated with said serrated lever plates having a bearing surface, and having one end pivotally supported and the other end adapted to be moved from a first location to a second location; means for normally holding said other end of said further lever plate at said first location so as to locate a portion of said control member between said serrated lever plates and said bearing surface of said further lever plate thereby preventing actuation of said serrated lever plates to said second position except those serrated lever plates having serrations at an index position adjacent to which said control member may be located; means for advancing the differentially movable member of said calculating machine; means including said advancing means for causing said differentially movable member to be set according to a decimal number entered into said calculating machine whereby the setting of said differentially movable member causes said control member to be located at an index position corresponding to that decimal number; means for rendering said actuating means effective to actuate those actuable members having serrations at the index position adjacent to which said control member is located when the number represented by the setting of said differentially movable member is to be transferred to said storage means of said computer; means responsive to the actuable members thus actuated for setting up a number in said storage means of said computer corresponding to that number represented by the setting of said differentially movable member; means for making said holding means ineffective when said differentially movable member is to be set according to a number set up in said storage means of said computer; means for bringing said further lever plate to said second location when said holding means is made ineffective; and means for rendering said actuating means effective to actuate certain of said actuable members in accordance with the number set up in said storage means of said computer; said advancing means being then operable to cause said control member to cooperate with the serrations provided at a predetermined index position of said actuable members thus actuated to set said differentially movable member to represent a decimal number corresponding to that number set up in said storage means of said computer.

3. In a computing system having a calculating machine having a differentially movable member which is settable to represent numbers in accordance with the decimal system, and a computer having a storage means which is settable to represent numbers according to a combinational code system, data conversion apparatus for transferring data in either direction between said calculating machine and said computer comprising: a pawl member carried by the differentially movable member of said calculating machine; a plurality of actuable members, in the form of lever plates associated with said pawl member, each of said lever plates being pivotally supported at one thereof, and having a portion thereof divided into a plurality of index positions and having serrations provided at some of the index positions thereof; a further lever plate associated with said serrated lever plates being pivotally supported at one end thereof; means for normally holding the other end of said further lever plate in a lowered position so as to locate a portion of said pawl member between said serrated lever plates and a bearing surface of said further lever plate, thereby preventing raising of said serrated lever plates except those having serrations at an index position adjacent to which said portion of said pawl member may be located; means for bringing said further lever plate to a raised position when said holding means is rendered ineffective; energizing members associated with said serrated lever plates; means for advancing the differentially movable member of said calculating machine; means including said advancing means for causing said differentially movable member to be set according to a decimal number entered into said calculating machine whereby the setting of said differentially movable member causes said pawl member to be located at an index position corresponding to that decimal number; means for energizing said energizing members simultaneously so as to raise the other end of those serrated plates having serrations at the index position adjacent to which said portion of said pawl member is located when the number represented by the setting of said differentially movable member is to be transferred to said storage means of said computer; means interconnecting said energizing members and said storage means of said computer and responsive to the raised serrated lever plates, so as to set up a number in said storage means of said computer corresponding to that number represented by the position of the differentially movable member of said calculating machine; means for making said holding means ineffective when said differentially movable member is to be set according to a number set up in said storage means of said computer; means for bringing said other end of said further lever plate to a raised position when said holding means is made ineffective; and means for energizing said energizing members selectively in accordance with the number set up in said storage means of said computer so as to raise the other ends of the serrated lever plates associated with the energizing members thus energized; said advancing means being then operable to cause said differentially movable member and said pawl member to advance, and said pawl member to cooperate with the serrations provided at a predetermined index position of the raised serrated lever plates to set said differentially movable member to represent a decimal number corresponding to that number set up in said storage means of said computer.

4. In a computing system having a calculating machine having a differentially movable member which is settable to represent numbers in accordance with the decimal system, and a computer having a storage means which is settable to represent numbers according to a combinational code system, data conversion apparatus for transferring data in either direction between said calculating machine and said computer comprising: a pawl member carried by the differentially movable member of said calculating machine; a plurality of actuable members in the form of lever plates, each of said lever plates being pivotally supported at one end thereof, each of said lever plates having a portion of the top surface thereof divided into a plurality of index positions and having serrations provided at some of the index positions thereof; a further lever plate associated with said serrated lever plates having a bearing surface, and being pivoted at one end thereof; said pawl member having a nose portion having a width sufficient to span all of said lever plates; means for normally holding the other end of said further lever plate in a lowered position so as to locate the nose portion of said pawl member between the top surfaces of said serrated lever plates and the bearing surface of said further lever plate; said other end of said further lever plate when in said lowered position preventing raising of said serrated lever plates except those having serrations at an index position adjacent to which the nose portion of said pawl member may be located; energizing members associated with said serrated lever plates; means for advancing the differentially movable member of said calculating machine; means including said advancing means for causing said differentially movable member to be set according to a decimal number entered into said calculating machine whereby the setting of said differentially movable member causes said pawl member to be located at an index position corresponding to that decimal number; means for energizing said energizing members simultaneously so as to raise the other end of those serrated plates having serrations at the index position adjacent to which the nose portion of said pawl member is located when the number represented by said differentially movable member is to be transferred to said storage means of said computer; means interconnecting said energizing members and said storage means of said computer and responsive to the raised serrated lever plates, so as to set up a number in said storage means of said computer corresponding to that number represented by the setting of the differentially movable member of said calculating machine; means for making said holding means ineffective when said differentially movable member is to be set according to a number set up in said storage means of said computer; means for bringing said other end of said further lever plate to a raised position when said holding means is made ineffective; and means for energizing said energizing members selectively in accordance with the number set up in said storage means of said computer so as to raise the other ends of the serrated lever plates associated with the energizing members thus energized; said advancing means being then operable to cause said differentially movable member and said pawl member to advance, and said pawl member to cooperate with the serrations provided at a predetermined index position of the raised serrated lever plates to set said differentially movable member to represent a decimal number corresponding to that number set up in said storage means of said computer.

5. In a computing system having a calculating machine having a cam shaft and a differentially movable member which is settable to represent numbers in accordance with the decimal system, and a computer having a storage means which is settable to represent numbers according to a combinational code system, data conversion apparatus for transferring data in either direction between said calculating machine and said computer comprising: a pawl member carried by the differentially movable member of said calculating machine; a plurality of actuable members, in the form of lever plates, each of said lever plates being pivoted at one end thereof; a zero stop plate associated with said lever plates having a bearing surface and pivoted at one end thereof, said zero stop plate having a projection for preventing forward movement of said pawl member; said pawl member having a nose portion having a width sufficient to span said lever plates and said zero stop plate; means including an actuating member for normally holding said zero stop plate in a first position so as to locate the nose portion of said pawl member between top surfaces of said lever plates and the bearing surface of said zero stop plate; means for bringing said zero stop plate to a second position when said holding means is rendered ineffective; energizing members associated with said lever plates for raising said lever plates; means for advancing the differentially movable member of said calculating machine; zero stop means in said calculating machine for normally preventing advancement of the differentially movable member except when said differentially movable member is to be set under control of a decimal number entered into said calculating machine; a first electrical relay device adapted to be energized in response to a signal from said calculating machine indicating that a number represented by a setting of said differentially movable member of said calculating machine is to be transferred to the storage means of said computer; a first cam member mounted on said cam shaft and adapted to lock said first relay device for a predetermined period of the cycle of said calculating machine, and to allow a signal to be sent to said computer to condition said computer for the transfer operation; means including said advancing means for causing said differentially movable member to be set according to a decimal number entered into said calculating machine whereby the setting of said differentially movable member causes said pawl member to be located at an index position corresponding to that decimal number; means for effecting energization of said energizing members when the number represented by the setting of said differentially movable member is to be transferred to said storage means of said computer; said energization-effecting means including a second cam member mounted on said cam shaft and adapted at a predetermined portion of the cycle of said calculating machine to cause the energizing members to be simultaneously energized whereby only those lever plates having serrations beneath the nose portion of said pawl member are raised; said storage means comprising a plurality of storage devices, with one of said storage devices being provided for each of said energizing members; electrical contact members associated with said energizing members and adapted to be selectively closed when the associated lever plates are raised, the contact members being connected one to each of said storage devices such that said storage devices are selectively operable to register a number equivalent to the number represented by the setting of said differentially movable member of said calculating machine; a second electrical relay device adapted to be energized in response to a signal from said calculating machine indicating that a number set up in the storage means of said computer is to be transferred to said calculating machine; said first cam member adapted to lock said second relay device so as to condition said computer for the transfer operation; means for making said holding means ineffective when said differentially movable member is to be set according to a number set up in said storage means of said computer, including a third cam member mounted on said cam shaft, a rotary transmission device, and a third electrical relay device, said third cam member being operable at a predetermined portion of the cycle of said calculating machine to operate said third relay device to cause said rotary transmission device to be energized so as to operate said actuating member and allow said zero stop plate to move to said second position in which the nose portion of said pawl member is located behind the projection on said zero stop plate; means for rendering said storage devices selectively operable in accordance with the number set up in said storage means of said computer; means for effecting energization of said energizing members in accordance with the storage devices selectively operated, said energization-effecting means including a third cam member mounted on said cam shaft and adapted at a predetermined portion of the cycle of said calculating machine to cause energizing members associated with the operated storage devices to be energized thereby moving the nose portion of said pawl member from behind the projection of said zero stop plate; an operating means for said zero stop means, said zero stop operating means being responsive to energization of said energizing members to render said zero stop means ineffective to prevent advancement of said differentially movable member of said calculating machine; said advancing means being then operable to cause said differentially movable member and said pawl member to advance, and said pawl member to be located at an index position defined by the first serration or aligned serrations of the raised lever plates to locate the differentially movable member of said calculating machine at a setting representing the numerical equivalent of the number set up in said storage means of said computer; and means for causing said holding means to become effective again to restore said zero stop plate to its first position including a fourth cam member mounted on said cam shaft, and a second rotary transmission device, said fourth cam member adapted at a predetermined portion of the cycle of said calculating machine to cause said second rotary transmission device to be energized so as to operate said actuating member to allow said zero stop plate to return to its first position.

6. In a computing system having a calculating machine having a cam shaft and a differentially movable member which is settable to represent numbers in accordance with the decimal system, and a computer having a storage means which is settable to represent numbers according to a combinational code system, data conversion apparatus for transferring data in either direction between said calculating machine and said computer comprising: a pawl member carried by the differentially movable member of said calculating machine; a plurality of actuable members, in the form of lever plates, each of said lever plates being pivoted at one end thereof; a zero stop plate associated with said lever plates having a bearing surface and pivoted at one end thereof, said zero stop plate having a projection for preventing forward movement of said pawl member; said pawl member having a nose portion having a width sufficient to span said lever plates and said zero stop plate; means including an actuating member for normally holding said zero stop plate in a first position so as to locate the nose portion of said pawl member between top surfaces of said lever plates and the bearing surface of said zero stop plate; means for bringing said zero stop plate to a second position when said holding means is rendered ineffective; energizing members associated with said lever plates for raising said lever plates; an electrical energizing source for said energizing members; means for advancing the differentially movable member of said calculating machine; zero stop means in said calculating machine for normally preventing advancement of the differentially movable member except when said differentially movable member is to be set under control of a decimal number entered into said calculating machine; a first electrical relay device adapted to be energized in response to a signal from said calculating machine indicating that a number represented by a setting of said differentially movable member of said calculating machine is to be transferred to the storage means of said computer; a first cam member mounted on said cam shaft and adapted to lock said first relay device for a predetermined period of the cycle of said calculating machine, and to allow a signal to be sent to said computer to condition said computer for the transfer operation; means including said advancing means for causing said differentially movable member to be set according to a decimal number entered into said calculating machine whereby the setting of said differentially movable member causes said pawl member to be located at an index position corresponding to that decimal number; means for effecting energization of said energizing members when the number represented by the setting of said differentially movable member is to be transferred to said storage means of said computer; said energization-effecting means including a second cam member mounted on said cam shaft and adapted at a predetermined portion of the cycle of said calculating machine to cause the energizing members to be connected to said energizing source so as to effect simultaneous energization of said energizing members whereby only those lever plates having serrations beneath the nose portion of said pawl member are raised; said storage means comprising a plurality of storage devices, with one of said storage devices being provided for each of said energizing members; electrical contact members associated with said energizing members and adapted to be selectively closed when the associated lever plates are raised, the contact members being connected one to each of said storage devices such that said storage devices are selectively operable to register a number equivalent to the number represented by the setting of said differentially movable member of said calculating machine; a second electrical relay device adapted to be energized in response to a signal from said calculating machine indicating that a number set up in the storage means of said computer is to be transferred to said calculating machine; said first cam member adapted to lock said second relay device so as to condition said computer for the transfer operation; means for making said holding means ineffective when said differentially movable member is to be set according to a number set up in said storage means of said computer, said last-mentioned means including a third cam member mounted on said cam shaft, a rotary transmission device, and a third electrical relay device, said third cam member being operable at a predetermined portion of the cycle of said calculating machine to operate said third relay device to cause said rotary transmission device to be energized so as to operate said actuating member and allow said zero stop plate to move to said second position in which the nose portion of said pawl member is located behind the projection on said zero stop plate; means for rendering said storage devices selectively operable in accordance with the number set up in said storage means of said computer; means for effecting energization of said energizing members in accordance with the storage devices selectively operated, said energization-effecting means including a third cam member mounted on said cam shaft and adapted at a predetermined portion of the cycle of said calculating machine to cause energizing members associated with the operated storage devices to be connected to said energizing source thereby moving the nose portion of said pawl member from behind the projection of said zero stop plate; and an operating means for said zero stop means, said zero stop operating means being responsive to energization of said energizing members to render said zero stop means ineffective to prevent advancement of said differentially movable member of said calculating machine; said advancing means being then operable to cause said differentially movable member and said pawl member to advance, and said pawl member to be located at an index position defined by the first serration or aligned serrations of the raised lever plates to locate the differentially movable member of said calculating machine at a setting representing the numerical equivalent of the number set up in said storage means of said computer.

7. In a computing system having a calculating machine having a cam shaft and a differentially movable member which is settable to represent numbers in accordance with the decimal system, and a computer having a storage means which is settable to represent numbers according to a combinational code system, data conversion apparatus for transferring data in either direction between said calculating machine and said computer comprising: a pawl member carried by the differentially movable member of said calculating machine; a plurality of actuable members, in the form of lever plates, each of said lever plates being pivoted at one end thereof; a zero stop plate associated with said lever plates having a bearing surface and pivoted at one end thereof, said zero stop plate having a projection for preventing forward movement of said pawl member; said pawl member having a nose portion having a width sufficient to span said lever plates and said zero stop plate; means including an actuating member for normally holding said zero stop plate in a first position so as to locate the nose portion of said pawl member between the top surfaces of said lever plates and the bearing surface of said zero stop plate; means for bringing said zero stop plate to a second position when said holding means is rendered ineffective; energizing members associated with said lever plates for raising said lever plates; an electrical energizing source for said energizing members; means for advancing the differentially movable member of said calculating machine; zero stop means in said calculating machine for normally preventing advancement of the differentially movable member except when said differentially movable member is to be set under control of a decimal number entered into said calculating machine; a first electrical relay device adapted to be energized in response to a signal from said calculating machine indicating that a number represented by a setting of said differentially movable member of said calculating machine is to be transferred to the storage means of said computer; a first cam member mounted on said cam shaft and adapted to lock said first relay device for a predetermined period of the cycle of said calculating machine, and to allow a signal to be sent to said computer to condition said computer for the transfer operation; means including said advancing means for causing said differentially movable member to be set according to a decimal number entered into said calculating machine whereby the setting of said differentially movable member causes said pawl member to be located at an index position corresponding to that decimal number; means for effecting energization of said energizing members when the number represented by the setting of said differentially movable member is to be transferred to said storage means of said computer; said energization-effecting means including a second cam member mounted on said cam shaft and adapted at a predetermined portion of the cycle of said calculating machine to cause the energizing members to be connected to said energizing source so as to effect simultaneous energization of said energizing members whereby only those lever plates having serrations beneath the nose portion of said pawl member are raised; said storage means comprising a plurality of storage devices, with one of said storage devices being provided for each of said energizing members; electrical contact members associated with said energizing members and adapted to be selectively closed when the associated lever plates are raised, the contact members being connected one to each of said storage devices such that said storage devices are selectively operable to register a number equivalent to the number represented by the setting of said differentially movable member of said calculating machine; a second electrical relay device adapted to be energized in response to a signal from said calculating machine indicating that a number set up in the storage means of said computer is to be transferred to said calculating machine; said first cam member adapted to lock said second relay device so as to condition said computer for the transfer operation; means for making said holding means ineffective when said differentially movable member is to be set according to a number set up in said storage means of said computer, said last-mentioned means including a third cam member mounted on said cam shaft, a rotary transmission device, and a third electrical relay device, said third cam member being operable at a predetermined portion of the cycle of said calculating machine to operate said third relay device to cause said rotary transmission device to be energized so as to operate said actuating member and allow said zero stop plate to move to said second position in which the nose portion of said pawl member is located behind the projection on said zero stop plate; means for rendering said storage devices selectively operable in accordance with the number set up in said storage means of said computer; means for effecting energization of said energizing members in accordance with the storage devices selectively operated, said energization-effecting means including a third cam member mounted on said cam shaft and adapted at a predetermined portion of the cycle of said calculating machine to cause energizing members associated with the operated storage devices to be connected to said energizing source thereby moving the nose portion of said pawl member from behind the projection of said zero stop plate; an operating means for said zero stop means, said zero stop operating means being responsive to energization of said energizing members to render said zero stop means ineffective to prevent advancement of said differentially movable member of said calculating machine; said advancing means being then operable to cause said differentially movable member and said pawl member to advance, and said pawl member to be located at an index position defined by the first serration or aligned serrations of the raised lever plates to locate the differentially movable member of said calculating machine at a setting representing the numerical equivalent of the number set up in said storage means of said computer; and means for causing said holding means to become effective again to restore said zero stop plate to its first position including a fourth cam member mounted on said cam shaft, and a second rotary transmission device, said fourth cam member adapted at a predetermined portion of the cycle of said calculating machine to cause said second rotary transmission device to be energized so as to operate said actuating member to allow said zero stop plate to return to its first position.

References Cited in the file of this patent

UNITED STATES PATENTS

| | | |
|---|---|---|
| 2,285,353 | Peirce | June 2, 1942 |
| 2,323,824 | Maschmeyer | July 6, 1943 |
| 2,332,755 | Robertson et al. | Oct. 26, 1943 |
| 2,369,430 | Brand et al. | Feb. 13, 1945 |
| 2,497,784 | Mehan et al. | Feb. 14, 1950 |
| 2,550,133 | Allan | Apr. 24, 1951 |
| 2,675,176 | Perrin | Apr. 13, 1954 |
| 2,697,551 | Rench | Dec. 21, 1954 |
| 2,757,862 | Boyden et al. | Aug. 7, 1956 |
| 2,761,620 | Lindesmith et al. | Sept. 4, 1956 |
| 2,767,907 | Schwend | Oct. 23, 1956 |
| 2,770,415 | Lindesmith | Nov. 13, 1956 |
| 2,772,048 | Collison et al. | Nov. 27, 1956 |
| 2,783,939 | Boyden et al. | Mar. 5, 1957 |
| 2,793,806 | Lindesmith | May 28, 1957 |
| 2,801,406 | Lubkin | July 30, 1957 |
| 2,812,902 | Runde et al. | Nov. 12, 1957 |
| 2,842,310 | Matthew | July 8, 1958 |